Sept. 6, 1960  W. S. ROUVEROL  2,951,384
VARIABLE SPEED TRANSMISSION
Filed Sept. 24, 1956  6 Sheets-Sheet 1
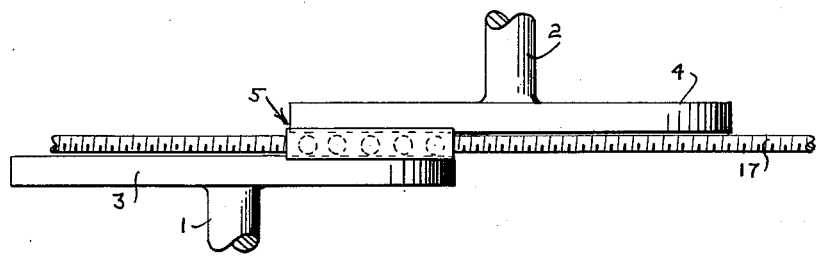
FIG_1
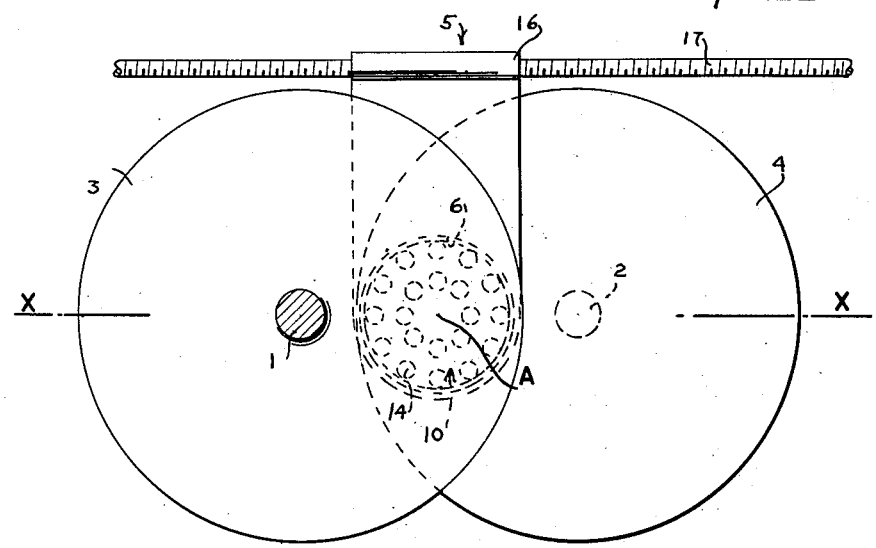
FIG_2
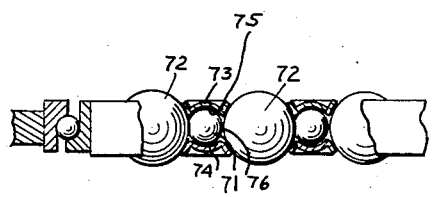
FIG_6
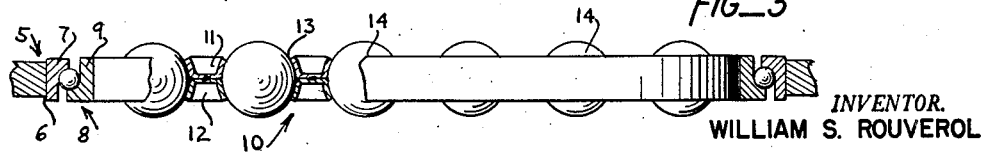
FIG_3
INVENTOR.
WILLIAM S. ROUVEROL
BY
Boyken, Mohler & Wood
ATTORNEYS Sept. 6, 1960 W. S. ROUVEROL 2,951,384
VARIABLE SPEED TRANSMISSION
Filed Sept. 24, 1956 6 Sheets-Sheet 2
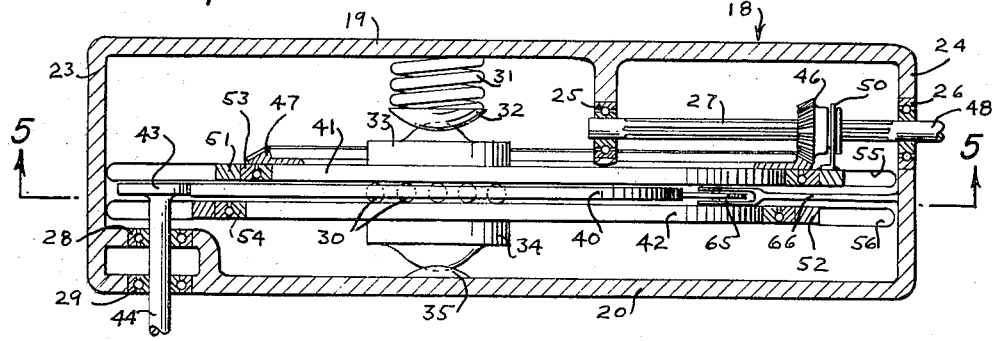
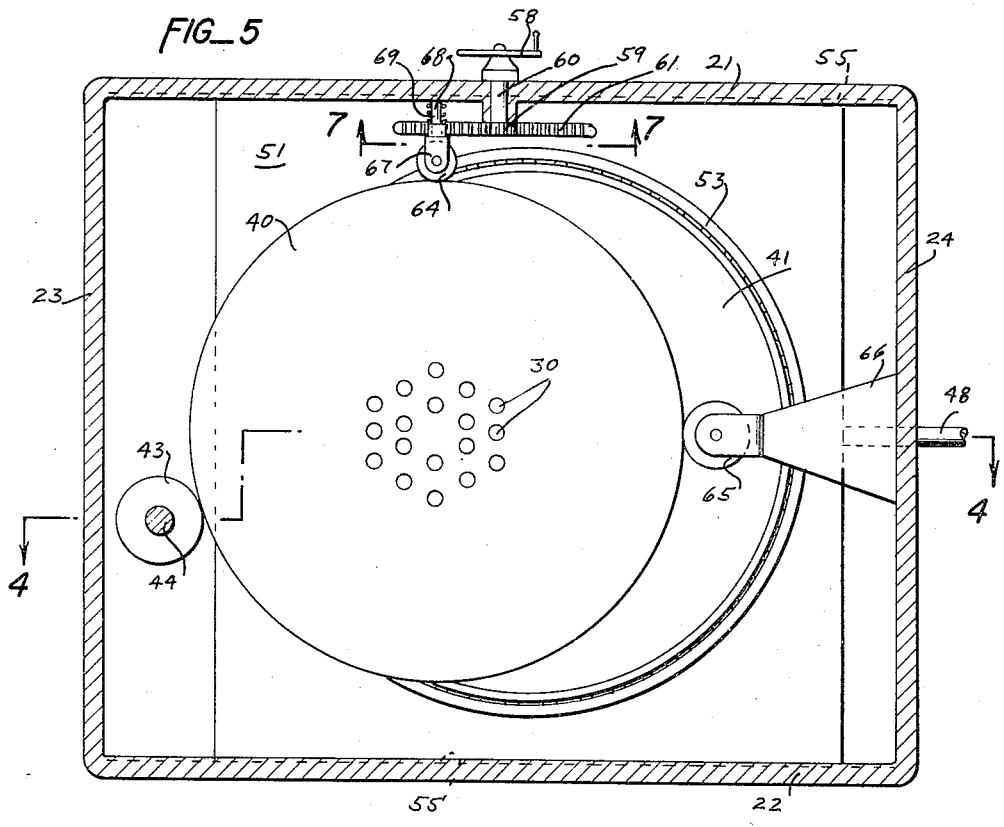
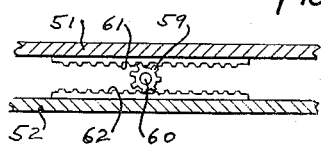
INVENTOR.
WILLIAM S. ROUVEROL
BY
Boyken, Mohler & Wood
ATTORNEYS

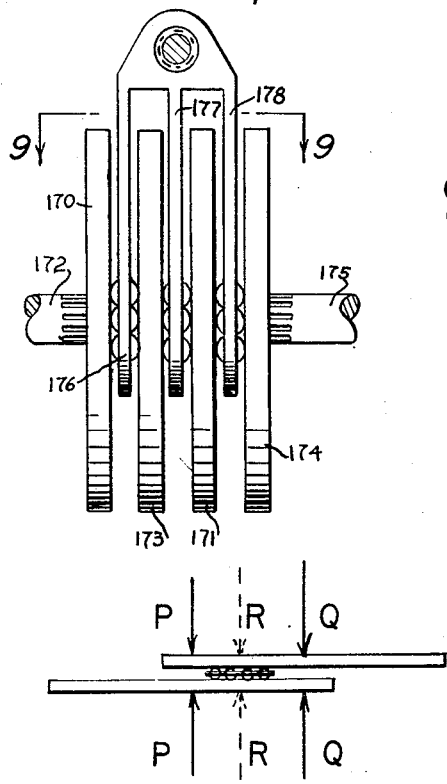
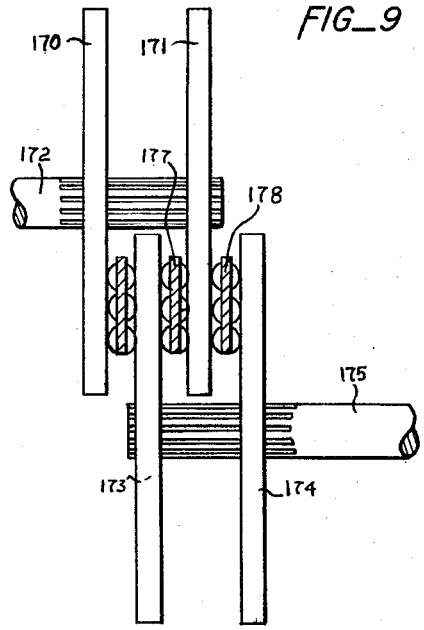
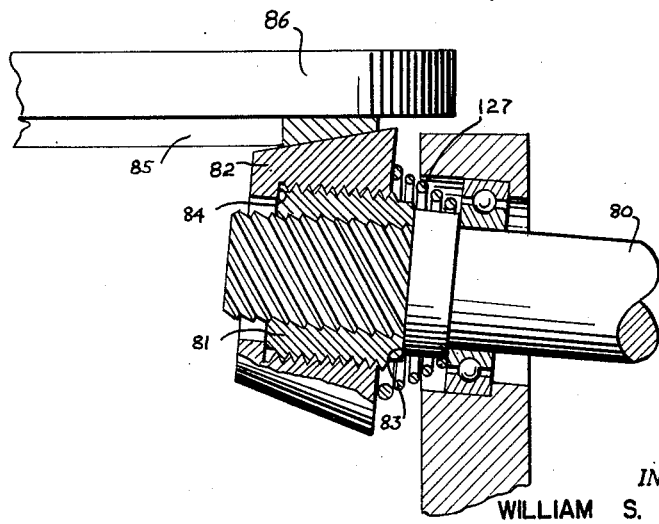

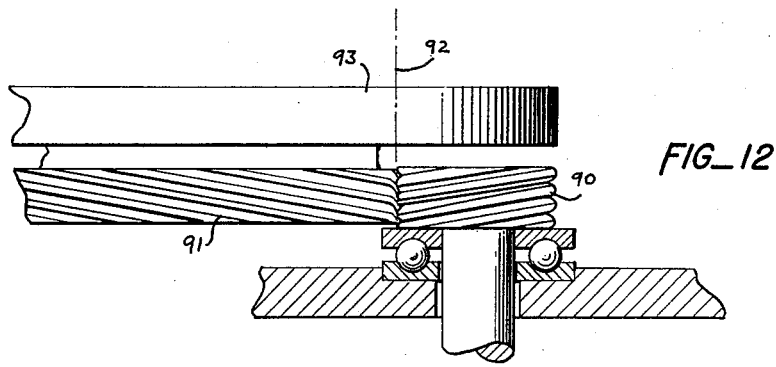
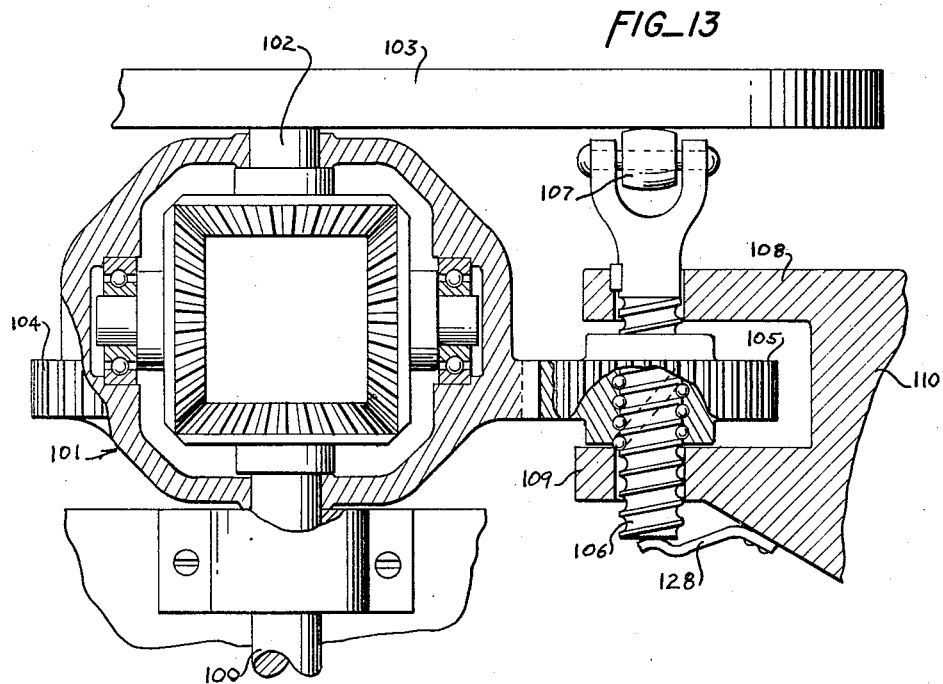

Sept. 6, 1960     W. S. ROUVEROL     2,951,384
VARIABLE SPEED TRANSMISSION
Filed Sept. 24, 1956     6 Sheets-Sheet 5
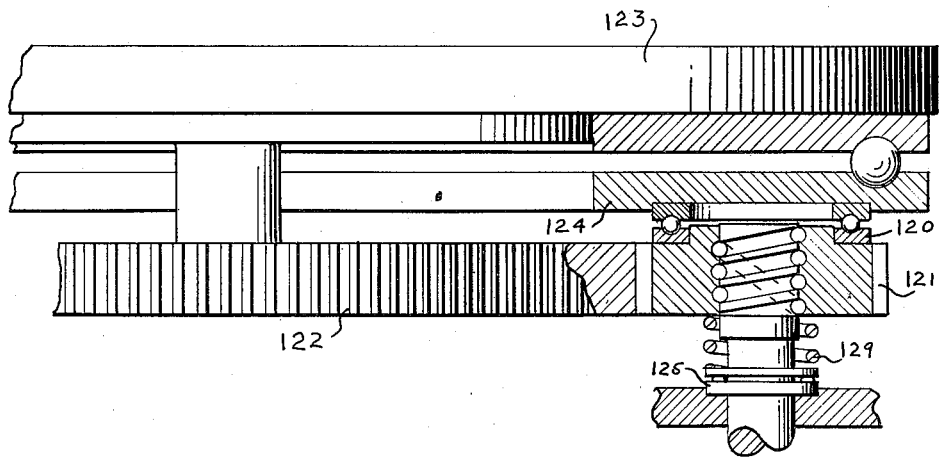
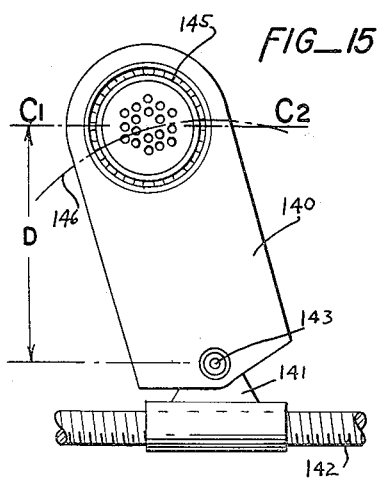
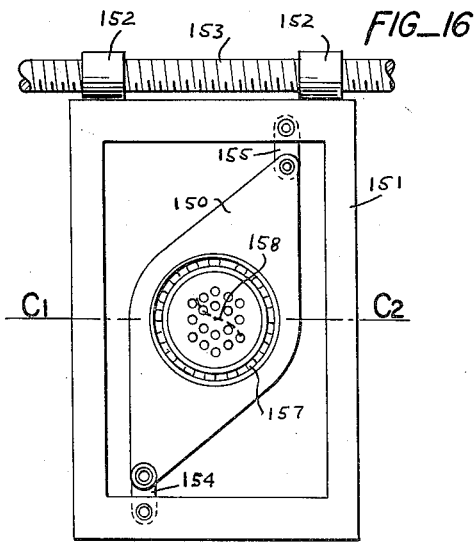
INVENTOR.
WILLIAM S. ROUVEROL
BY
*Boyken, Mohler & Wood*
ATTORNEYS Sept. 6, 1960  W. S. ROUVEROL  2,951,384
VARIABLE SPEED TRANSMISSION
Filed Sept. 24, 1956  6 Sheets-Sheet 6
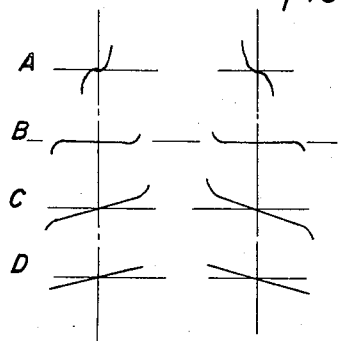
FIG_17
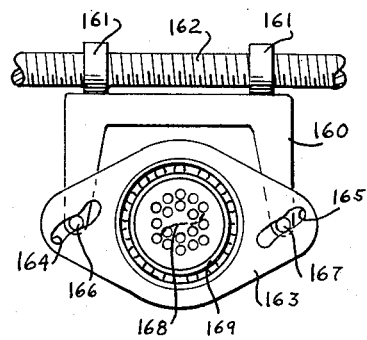
FIG_18
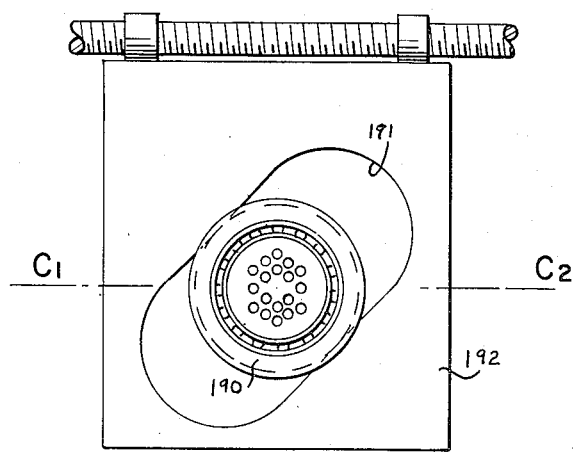
FIG_19
INVENTOR.
WILLIAM S. ROUVEROL
BY
Boyken, Mohler & Wood
ATTORNEYS United States Patent Office 2,951,384
Patented Sept. 6, 1960

2,951,384

VARIABLE SPEED TRANSMISSION

Wililam S. Rouverol, 1014 Shattuck Ave., Berkeley, Calif.

Filed Sept. 24, 1956, Ser. No. 611,485

30 Claims. (Cl. 74—198)

This invention relates to variable speed transmissions of the friction type wherein a ball is pressed between two rotatable opposed members or disks.

This "ball and disk" type of transmission has inherent advantages over conventional transmissions. For example, in most conventional transmissions, there is generally line contact between interengaging elements. Such a line contact, although affording greater area for the transmission of forces, cannot be successfully attained in conjunction with speed variability unless sliding takes place along some or all portions of the contact line. Such sliding creates problems of inefficiency, heating and wear.

On the other hand, with point contact between interengaging elements, speed variation may be achieved without departure from pure rolling action. In addition, inherent in ball and disk drives, are the advantages of wide variations in speeds and ease of adjustment of the speed ratio, even when operating under load. Prior art transmissions of the ball type have, however, the important disadvantages of relatively low capacity and low efficiency. Examples of such devices are shown in Dicke Patents 2,512,717; 2,596,538; 2,656,733 and Ahnger Patent 2,209,254.

The main object of the present invention is therefore to overcome the disadvantages of prior art ball and disk types of transmissions without sacrificing any of the advantages. This is accomplished by the provision of a novel housing means which permits the use of a plurality of rolling elements in engagement with the opposed plates. The multiple points of contact thereby afforded enable the transmission of greater torques. Furthermore, the arrangement of the rolling elements is such that a pure rolling action of each is insured, thus avoiding any energy loss that would occur if sliding action between the elements and disks took place.

Another object of the invention is the provision of an improved means for applying varying amounts of pressure between the rolling elements and their associated disks depending upon the amount of torque to be transmitted. In this connection it should be noted that, since rolling friction is proportional to the load imposed on the rolling element normal to the plane of rolling, it is advantageous to impose only as much normal load as is needed to develop sufficient traction. By the present invention automatic means is provided for so adjusting the normal load to achieve optimum efficiency.

Other objects and advantages will be seen from the following specification and drawings.

Fig. 1 is a semi-schematic plan view of a device incorporating the invention.

Fig. 2 is a vertical cross section through the driving shaft showing the disks.

Fig. 3 is a greatly enlarged cross section of the cage housing showing the cage housing with the cage in elevation but partially broken away to show its internal structure.

Fig. 4 is a vertical sectional view of a modified form of the invention in which the driving and driven elements are the cage and one disk, the other disk serving, in effect, as an idler.

Fig. 5 is a horizontal cross section of the device of Fig. 4, as taken along lines 5—5 of Fig. 4.

Fig. 6 is a fragmentary cross section through a modified form of cage.

Fig. 7 is a section taken along lines 7—7 of Fig. 5.

Fig. 8 is a semi-schematic side elevation of a modification showing a multicage system.

Fig. 9 is a view at right angles to Fig. 8 showing the disks in plan view and with the cage housing in section as taken along lines 9—9 of Fig. 8.

Fig. 10 is a schematic view showing one method of impressing the desired normal force on the rolling elements.

Fig. 11 is a fragmentary side elevation of a disk showing a driving means partially in section for automatically applying an axial thrust load on the disk in proportion to the torque transmitted thereto.

Fig. 12 is a view similar to Fig. 11 but showing a modified form thereof.

Fig. 13 is a view similar to Fig. 11 showing still another modified form.

Fig. 14 is a view similar to Fig. 11 showing an additional modified form.

Fig. 15 is a view showing one means for moving the cage.

Fig. 16 is a view of another means for moving the cage.

Fig. 17 is a schematic view showing the loci of the cage positions.

Figs. 18 and 19 are views showing still other means for moving the cage.

In detail, and referring to Fig. 1, parallel input shaft 1 and output shaft 2 are respectively provided at their adjacent ends with opposed parallel disks 3, 4 which rotate with the shafts 1, 2.

Mounted between the disks 3, 4 is a housing generally designated 5. As will be subsequently described, housing 5 is adjustably mounted for movement transversely of the axes of shafts 1, 2.

Housing 5 is provided with a circular opening 6 to the walls of which is fixedly secured the outer race 7 of an annular antifriction bearing generally designated 8 (Fig. 3). The inner race 9 contains a cage generally designated 10 which may be conveniently formed by upper and lower plates 11, 12 respectively which are formed and rigidly secured together to provide a plurality of separate ball housings 13. The cage 10 is of course secured to the inner race 9 and is thus freely supported for rotation relative to the housing 5 and about an axis parallel to the axes of shafts 1, 2.

The housing 5 is supported for translation relative to the disks 3, 4 so that the axis of rotation of cage 10 should lie substantially within the plane common to the axes of shafts 1, 2.

Within each ball housing 13 is a ball 14 the opposite sides of which are in rolling engagement with disks 3, 4 respectively. As will subsequently be described in greater detail, various devices may be employed for applying a force to obtain the desired pressure to the balls 14. Such a force should of course be as small as possible and still provide perfect rolling between the balls and disks without sliding.

It may be demonstrated upon rotation of the driving disk 3, the balls 14, if constrained to roll in a circular path about a point on the axis x—x (Fig. 2) at which the velocities of disks 3, 4 are equal and opposite, will roll without sliding. In other words, if the housing 5 is positioned so that the center A of cage 10 is at such point, the balls 14 move in circles about said point without sliding, and the cage containing them rotates with an angular velocity which is always equal to the average angular velocity of the two disks.

If the cage of balls is not positioned centrally relative to the point at which the velocities of the disk are the same, the speed of the driven disk automatically changes until the condition is met. If it is desired to change the speed of the driven disk, it is therefore merely necessary to shift the housing 5 toward or away from the driving disk depending upon whether the speed of the driven disk is to be reduced or increased.

One method of shifting housing 5 is illustrated in Figs. 1, 2 wherein the housing 5 is rigidly secured to a nut 16 threadedly carried by a jackscrew 17. Jackscrew 17 may be of the conventional type supported in suitable bearings (not shown) and driven by any suitable means.

A modification of the invention wherein power is transmitted through the cage is disclosed in Figs. 4, 5. A closed housing generally designated 18 is provided having a top 19, a bottom 20, opposed sidewalls 21, 22 and opposed endwalls 23, 24.

Extending into housing 18 and rotatably supported on suitable bearings 25, 26 is a driven shaft 48 splined as indicated at 27 (Fig. 4). Slidable on the splined portion 27 of driven shaft 48 is a bevel pinion gear 46 which mates with a relatively large bevel gear 47 rigidly secured to the driven disk 41. In spaced opposed relation to driven disk 41 is an idler disk 42 and interposed between said disks is a circular cage 40 which is mounted in trunnions in a manner to be described.

Engaging cage 40 on its periphery is a driving wheel 43 (Fig. 5) mounted on a driving shaft 44 which in turn extends through bottom 20 and is rotatably supported in bearings 28, 29.

Pressure is applied continuously on the balls 30 by means of a relatively heavy spring 31 interposed between the top 19 of housing 18 and a pressure plate 32. Coacting with pressure plate 32 is a complementarily formed thrust bearing 33 of the "Kingsbury" tilting shoe type which slidably engages the adjacent upper surface of the driven disk 41.

On the corresponding outer side of driving disk 42 a similar "Kingsbury" bearing 34 is employed seated in a complementarily formed seat member 35 secured to bottom wall 20.

Smoothest operation with maximum torque capacity will ordinarily be attained by locating the seats in cage 40 containing balls 30 more or less symmetrically with respect to the axis of rotation of cage 40. Equal sectors about the axis would thus contain approximately equal numbers of balls, although the density of ball placement per unit cage area may be varied in the radial direction if it is desired to control the amount of load on the outer balls as compared to that on the inner balls. Arrangement of the balls 30 to achieve the optimum effect need not be in concentric circles as shown in Fig. 2, or in polygons as shown in Fig. 5, but may be along one or more spirals or in other convenient patterns.

By the above described structure it will be apparent that the same pressure is applied at all times to the balls 30. Means for varying such pressure in proportion to the torque transmitted will subsequently be described.

Driven disk 41 is rotatably supported in a large slender peripheral bearing 53 mounted in a flat plate or frame 51 which in turn is slidably supported for longitudinal movement in slots or grooves 55 formed in sidewalls 21, 22. Similarly, idler disk 42 is rotatably supported in bearing 54 mounted in plate 52 which is supported for longitudinal movement in slots or grooves 56.

By the above described structure it will be apparent that movement of driven and idler disks 41, 42 respectively relative to cage 40 may be effected by movement of their corresponding plates or frames 51, 52. Bevel gear pinion 46 is secured by means of a yoke member 50, in which pinion 46 is rotatable, to the plate 51 (Fig. 4) so that upon movement of said plate the pinion gear 46 remains in mesh with gear 47.

One means for moving plates 51, 52 is shown in Figs. 5 and 7. A handwheel 58 is provided secured to a shaft 60 which is rotatably supported in a suitable bearing in side wall 21 and carries on its inner end a pinion 59. Pinion 59 is in mesh with racks 61, 62 carried by the opposed side of plates 51, 52 respectively so that, upon rotation of handwheel 58, the plates 51, 52 move equal distances in opposite directions.

The circular cage 40 is mounted, preferably at three points, on trunnions. As best seen in Fig. 5, the driving wheel 43 constitutes one trunnion. Two adidtional trunnions 64, 65 may also be provided. Trunnion 65 may be rotatably supported on a bracket 66 fixedly secured as by welding to endwall 24. Trunnion 64 may be rotatably supported on a yoke member 67 which is slidably carried by a pin 68 rigidly secured to sidewall 21. A spring 69, interposed between sidewall 21 and yoke 67, serves to urge trunnion 64, and therefore cage 40, into frictional engagement with driving wheel 43.

The present invention also contemplates, as an equivalent of the structure shown in Figs. 4, 5, the substitution of a toothed gear for driving wheel 43, and the use of trunnions for supporting the disks instead of bearings.

Another obvious extension of the principle employed by the above described structure is the provision of a geared power take off arrangement on idler disk 42 as well as on driven disk 41. In such a case the power may obviously be made to flow in either direction.

From the above described forms of the invention it will be apparent that an analogy exists between this invention and a three wire junction in an electrical circuit wherein power may be fed into any one or two of the elements and taken out at the remaining one or two.

Another modification of the invention is shown in Fig. 6 wherein a relatively small ball 71 is positioned between and in rolling engagement with a pair of adjacent torque transmitting balls 72. The exact position of the intermediate ball 71 should of course be on a line joining the centers of the balls 72. Intermediate ball 71 may be rotatably supported on the cage plates 73, 74 by providing indentations 75, 76 respectively on said plates for receiving portions of the ball 71.

By the structure of Fig. 6 power losses due to rubbing friction between the balls and their housing may be minimized.

An obvious extension of the principle herein disclosed is shown in Figs. 8, 9 and constitutes the provision of a plurality of disks 170, 171 on the driven shaft 172 cooperating with a plurality of corresponding disks 173, 174 on the driving shaft 175 with cages of balls 176, 177, 178 operatively interposed between each cooperating pair of disks. Such a structure, involving multiple disks, is of course contemplated by the instant invention. Shafts 172, 175 should, of course be splined as indicated in Figs. 8, 9 to permit varying the pressure on the balls.

Another extension of the principle herein disclosed is to make the disks and cage (or cages) spherically dished instead of flat. Such a structure, which merely involves warping of surfaces of the structures described above, is also contemplated by the instant invention.

*Pressure-applying means*

In the present invention, as in any power transmission utilizing tractive friction forces exerted by elements which roll without sliding, the principal power losses are due to rolling friction. For the simplest applications a large but substantially constant spring-loading may be adequate, but in most embodiments it will be found advantageous to impose only as much normal load as is needed to develop sufficient traction. To achieve optimum efficiency and capacity, embodiments of the subject invention should therefore preferably fulfill three conditions: First, the resultant normal load on the group of balls must pass more or less through the central point of the cage so that normal loads on all of the balls will be approximately equal; second, this resultant normal load should be proportional to the transmitted torque; and third, the line of action of this resultant normal force should shift with the cage whenever its position is altered to effect a speed variation.

For transmissions of the subject type employing fixed axes of rotation for the disks, there is a relatively simple method of applying pressure, which produces a resultant normal force of the proper magnitude acting through the center of the cage without the necessity of moving the points of application of the forces. This effect, which is shown schematically in Fig. 10, is possible because the position of the cage relative to the disk axes controls, not only the relative speeds of the disks, but, in an inverse manner, the relative transmitted torques as well. Consequently the application of a pair of opposed forces (P, P) (Fig. 10) coaxial with the input disk and of a magnitude proportional to the output torque, and the application of a second pair of opposed forces (Q, Q) coaxial with the output disk and of a magnitude similarly proportional to the input torque, produces a resultant R which fulfills the abovementioned conditions. It should be evident that only one of each pair of equal forces shown in Fig. 10 need be applied actively, since the opposed force will be developed automatically as a reaction if a suitable trunnion or thrust bearing is interposed between the disks and the rigid housing enclosing the entire assembly.

While there are a wide number of known devices of high mechanical advantage which may be utilized to exert sufficient active force on the backside of a disk, some are more suitable than others. Those based on the inclined plane, such as the jackscrew and the wedge, automatically compensate for wear and hence are preferable in this application to toggle or other linkages requiring continual adjustment. In addition, a compound type of jackscrew may be incorporated which will exert a unidirectional, torque-proportional thrust regardless of whether the operating torque is clockwise or counterclockwise. Such a device is shown in Fig. 11.

Threaded onto the end of the torque transmitting shaft 80 is a cylindrical sleeve 81 threaded both internally and externally, the external thread being of the opposite hand to the internal thread.

Threaded onto this intermediate member is a thrust applying member 82 which, in this case, is a bevel friction pinion cooperating with an annular complementarily formed ring 85 rigid with disk 86. Shoulders 83, 84 are provided on the shaft and the pinion respectively to restrict the direction of axial motion of the sleeve 81. Torque applied in one direction by shaft 80 causes the sleeve 81 and pinion 82 to move together axially relative to the shaft; torque applied in the opposite sense causes the pinion alone to move axially. But in both cases the pinion is urged against the backside of the disk 86 with a force approximately proportional to the absolute value of the transmitted torque.

There are several suitable modifications to this type of compound jackscrew. One is to arrange the right-hand and left-hand threaded engagements in tandem along the axis of the shaft, rather than concentrically. Another advantage in cases where the thread helix angles tend to be smaller than the angles of repose of the engaging thread surfaces, is to interpose balls between one or both threaded engagements as in a conventional ball screw. It should also be obvious that in applications of the invention requiring the transmission of power only in one direction, the intermediate member may be omitted and only a single thread system (or ball-and-thread system) is needed between the torque-applying member and the thrust-applying member. Examples of this simpler type of jackscrew are shown in Figs. 13, 14. The compound type of jackscrew could of course also be employed in either of these loading devices.

The mechanism of Fig. 12 does not employ a jackscrew as such, but utilizes a similar principle to exert a large normal pressure. In this construction, torque is transmitted through a helical gear 90 so located that the tooth pressure applied to the mating gear 91, rigidly attached to the disk 93, has a large component normal to the disk face and in alignment with the center line 92 of the opposed disk or disks. This normal component of tooth pressure may be made as large as desired by employing extremely small helix angles; in all cases it will be directly proportional to the torque-producing component, and hence will fulfill the above-mentioned conditions. It should perhaps be noted that this particular mechanism will urge the disk against the ball cage only if the torque acting on it is of the same sense as the thread advance.

In Figure 13, power is transmitted from the driving shaft 100, through a differential generally designated 101, to the shaft 102 that is integral with disk 103. The ring gear 104 on the differential housing is in mesh with a pinion 105 internally threaded to cooperate with a complementarily threaded shaft 106. Shaft 106 carries at one end a roller 107 in engagement with disk 103 and is slidably housed within the jaws 108, 109 of a fixed support 110. To reduce friction to a minimum a ball and thread type of connection between the pinion 105 and shaft 106 may be employed as indicated in Fig. 13.

It will be apparent that the turning effort on pinion 105, and therefore the thrust transmitted to disk 103, is directly proportional to the torque impressed on differential 101 and transmitted to disk 103.

If the disk 103 is rotatably supported at its periphery as by means such as shown in Fig. 4 the thrust effort may obviously be applied to the stationary race of the disk thrust bearing instead of through the roller 107.

Another method of exerting pressure is shown in Fig. 14, as applied to a disk supported on a large thrust bearing. Power is transmitted through a gear 121 operatively engaged with a mating gear 122 which is integral with the disk 123. Because the gear 121 is screwthreadedly connected to its shaft 125 it tends to shift along the length of the shaft and to exert on the thrust bearing 120 a force proportional to the torque transmitted through the screw connection. This force is in turn transmitted through the stationary race of the small thrust bearing 120 to the stationary race 124 of the large peripheral thrust bearing and thence to the disk 123. As indicated in Fig. 14, the ball and thread type of connection may be employed to reduce friction between the gear 121 and its shaft 125.

A force produced by this means could also be used to urge a roller against the backside of a disk mounted as in Fig. 13. Similarly the gear 121 could be engaged with a mating gear which drives the disk by peripheral contact as in Fig. 5 instead of a central shaft as shown in Fig. 14.

Figs. 11, 13, 14 show an elastic member 127, 128, 129 respectively interposed between the thrust-producing member and the torque-transmitting member, the effect of which is to impose a small preloading on the jackscrew. The function of such an element is to prevent the normal load on the balls from becoming zero when no torque is being transmitted, as would be the case during starting if a clutch or other load-disconnecting device is employed in series with embodiments of the invention which rely on a torque-proportional pressure to develop traction.

It will be apparent from the above descriptions that there are a number of different means of exerting at a desired point a pressure approximately proportional to a particular transmitted torque (Figs. 11, 12, 13, 14). In addition, as indicated in Fig. 10, the applied pressure may be made proportional to the sum of two applied torques. By extending this principle it is of course equally simple to resolve any number of torque-proportional forces in either direction into a single resultant. Similarly, two or more differential elements such as that shown at 101 in Fig. 13 may be operatively engaged with the pinion 105, so that the torque applied to the disk 103 is proportional to the sum (or difference, if some act in the opposite sense) of the torques transmitted through these several differential elements.

Pressures so exerted on the disks may be transmitted thereto through a number of intermediate means. If exerted coaxially with the disk, small central thrust bearings are suitable; pressures exerted noncentrally, however, must be applied through such elements as rollers or trunnions, large peripheral thrust bearings, or Kingsbury tilting pad thrust bearings. Any combination of such intermediate elements with any of the abovementioned methods of producing torque-proportional forces is of course contemplated by the instant invention.

Speed adjustment

For the power transmissions in which the speed ratio changes only while the driver rotates at a comparatively large velocity, the simplest means of adjusting the output velocity is a mechanism which positions the cage center positively along the line of disk centers, such as that shown in Fig. 1. In most applications of the invention which require speed changes at very low speed, or a particular velocity ratio to be fixed before motion begins, it may be necessary to employ more complicated types of adjustment mechanism. In general it will be found that if the center of the cage is slightly displaced from the line of disk centers, the cage will have a tendency to migrate in a direction parallel to this line. This fact may be utilized to facilitate shifting of the cage under low-velocity or stationary conditions, by a number of alternative constructions.

One such means is illustrated in Fig. 15, wherein a cage housing 140 is pivotally connected as at 143 to a dog or housing carriage 141 which is threadedly carried by a control rod 142. The perpendicular distance D from the locus of the pivot 143 to the line of disk centers $C_1$—$C_2$ is slightly less than the distance from the pivot 143 to the center of the cage. Consequently when the cage 145 is in an equilibrium position with its center on the line of disk centers, the centerline of the housing makes an angle of slightly more or less than 90 degrees with the line of disk centers, depending on the direction of disk rotation.

Upon shifting the housing carriage 141 in either direction through rotation of central rod 142 it will be noted that the cage 145 initially moves away from the line of centers $C_1$—$C_2$ because the cage housing 140 swings about pivot 143. However the cage housing 140 will subsequently tend to swing back to its initial inclination under the urging of cage 145 which seeks a position on the line of centers $C_1$—$C_2$. The unique advantage of the construction of Fig. 15 is that it permits the driving disk to rotate in either direction.

Fig. 16 shows another construction allowing a limited movement of the cage housing 150 relative to the positioning means which in this case is a carriage 151 provided with a pair of integral bosses 152 internally threaded to receive control rod 153. The cage housing 150 is connected to the carriage 151 through a pair of relatively short links 154, 155 in the manner shown in Fig. 16. As in the construction shown in Fig. 15, movement of the carriage 151 causes the cage 157 to shift to one side of the axis $C_1$—$C_2$ or the other depending upon the direction of such movement. However in this instance the cage 157 will migrate from its offset displaced position to its proper position on the line $C_1$—$C_2$ only if the driving disk rotates in the proper direction.

The dot-dash curve 158 of Fig. 16 indicates the locus of the center of cage 157 during shifting as above described. It will be apparent that the dimensions of the carriage, including the length of links 155, 156 may be varied to provide a wide variety of different movements of cage 157. Some possible loci curves A—D, are indicated in Fig. 17.

Curves similar to those marked A and B have the advantage that when power is being transmitted at a steady speed the resultant force on the cage is perpendicular to the line of disk centers, and a somewhat larger torque may be transmitted than is possible when the curve cuts the line of disk centers at an angle as in the arc 146 traced in Fig. 15 or the curves C and D in Fig. 17. The advantage of the latter however is that they permit a more precise adjustment of the velocity ratio.

Figs. 18, 19 show alternative methods of mounting the cage housing so that its center traces a prescribed curve such as those of Fig. 17.

In Fig. 18 the carriage 160 is carried by means of threaded lugs 161 on the central rod 162 as before. In this instance, however, the cage housing 163 is provided with slots 164, 165 cooperating with pins 166, 167 respectively on carriage 160. The pins slide within the slots so that for a given setting of the carriage the movement of the housing is determined by the shape of slots 164, 165. The locus 168 of cage 169 will of course correspond to the shape of the slots 164, 165.

In Fig. 19 a construction is shown for obtaining a similar result. However in this case the movement of the cage 190 is achieved by slidably mounting the same within the relatively large slot 191 in carriage 192.

It should be noted that in the aforementioned modification of the invention wherein speed variability is accomplished by lateral shifting of the disks, the mechanism offers no resistance, even when stationary, to alteration of the relative position of cage and disks, provided the amount of relative lateral shifting of cooperating disks is equal in magnitude and opposite in direction. In this particular embodiment it is therefore unnecessary to cause the cage center to deviate from the line of disk centers during speed changes.

In view of the many varied methods of (a) constructing the cage, (b) rotatably mounting the cage and disks, (c) transmitting torque to or from the cage or disks, (d) utilizing a multiplicity of cages and disks, (e) exerting a steady or torque-proportional pressure, (f) transmitting this pressure to the disks to develop sufficient tractive friction under the balls, and (g) adjusting the speed ratio by variation of the relative position of cage and disks, any combinations of these various methods are of course contemplated in the instant invention. Such combinations are essential to the construction of any complete variable speed power transmission embodying the invention, and the characteristics of various kinds of prime movers and power loads are sufficiently different to necessitate the utilization of many different combinations.

The specific embodiments of the invention herein described in detail should not be taken as restrictive of the invention as it is obvious that various modifications in design may be resorted to by those skilled in the art without departing from the spirit of the invention or from the scope of the following claims.

It should be noted that, although the ball mounting means is termed a "cage" in the above description, such means may also be considered to be a disk, as for example in Figs. 4, 5.

I claim:

1. In a power transmission that includes a pair of driving and driven disks in opposed relationship, a housing interposed between said disks, a cage peripherally supported in said housing for rotation relative thereto about an axis substantially parallel to the axes of rotation of said disks, a plurality of balls mounted in said cage with each of said balls in rolling engagement at its opposite sides with said disks.

2. A power transmission comprising a pair of opposed disks respectively mounted for rotation about parallel axes, a third disk interposed between said pair, means peripherally supporting said third disk for rotation about an axis parallel to the axes of said pair, a plurality of balls mounted in said third disk for rotation relative thereto and in engagement at their opposite sides with the opposed faces of said pair, means for applying a rotational effort to one of said three disks, whereby said rotational effort is transferred through said balls to one of the other two of said three disks.

3. A power transmission comprising a pair of opposed disks respectively mounted for rotation about parallel axes, a third disk interposed between said pair and supported for rotation about an axis parallel to the axes of said pair, a plurality of balls mounted in said third disk for rotation relative thereto and in engagement at their opposite sides with the opposed faces of said pair, means for applying a rotational effort to one of said three disks, whereby said rotational effort is transferred through said balls to one of the other two of said three disks, means supporting one of said disks for movement to different positions along a line transversely of said axes for varying the relative speed of rotation of two of said three disks, and means for holding said one disk in any one of said positions as desired.

4. A power transmission comprising a pair of opposed disks respectively mounted for rotation about parallel axes, a third disk interposed between said pair and supported for rotation about an axis parallel to the axes of said pair, a plurality of balls mounted in said third disk for rotation relative thereto in positions such that equal sectors about the axis of rotation of said third disk contain approximately equal numbers of balls, and in engagement at their opposite sides with the opposed faces of said pair, means for applying rotational effort to one of said three disks, whereby said rotational effort is transferred through said balls to one of the other two of said three disks, and means having an effective line of action substantially coaxial with said third disk for urging said pair toward each other during such rotation.

5. A power transmission comprising a pair of opposed disks respectively mounted for rotation about parallel axes, a third disk interposed between said pair and supported for rotation about an axis parallel to the axes of said pair, a plurality of balls mounted in said third disk for rotation relative thereto in positions such that equal sectors about the axis of rotation of said third disk contain approximately equal numbers of balls, and in engagement at their opposite sides with the opposed faces of said pair, means for applying rotational effort to one of said three disks whereby said rotational effort is transferred through said balls to the other two of said three disks, and means having an effective line of action substantially coaxial with said third disk for urging said pair toward each other with a force proportional to said rotational effort.

6. A power transmission comprising a pair of rotatably supported members provided with opposed surfaces, means for applying rotational effort to one of said members, a cage interposed between said members, means engaging said cage at its periphery for rotatably supporting the same, a plurality of rotatable elements mounted in said cage and in rolling engagement with said opposed surfaces whereby the rotational effort of said one member is transmitted through said elements to rotate the other of said members.

7. A power transmission comprising a pair of rotatably supported opposed disks, means for applying a rotational effort to one of said disks, a cage interposed between said disks, a plurality of rotatable elements mounted in said cage and in rolling engagement with the opposed faces of said disks whereby the rotational effort of said one disk is transmitted through said elements to rotate the other of said disks, and means mounting said cage at its periphery for rotation about an axis parallel to the axes of said disks.

8. A power transmission comprising a pair of opposed disks respectively mounted for rotation about spaced parallel axes, means for applying rotational effort to one of said disks, a cage supported for rotation about an axis parallel to the axes of said disks and adjacent a plane containing the axes of said disks, a plurality of balls mounted in said cage for rotation relative thereto and in engagement at their opposite sides with the opposed faces of said disks whereby the rotational effort of said one disk is transferred through said balls to the other of said disks and means for shifting said cage in a direction substantially transversely of the axes of said disks.

9. A power transmission comprising a pair of opposed disks respectively mounted for rotation about spaced parallel axes, means for applying a rotational effort to one of said disks, a cage supported for rotation about an axis parallel to the axes of said disks and adjacent a plane containing the axes of said disks, a plurality of balls mounted in said cage for rotation relative thereto and in engagement at their opposite sides with the opposed faces of said disks whereby the rotational effort of said one disk is transferred through said balls to the other of said disks, and pressure applying means operatively connected with said first mentioned means for urging said one disk toward the other, said pressure being applied substantially along a line of action coaxial with said other disk.

10. A power transmission comprising a pair of opposed disks respectively mounted for rotation about spaced parallel axes, means for applying a rotational effort to one of said disks, a cage supported for rotation about an axis parallel to the axes of said disks and adjacent a plane containing the axes of said disks, a plurality of balls mounted in said cage for rotation relative thereto and in engagement at their opposite sides with the opposed faces of said disks whereby the rotational effort of said one disk is transferred through said balls to the other of said disks, and pressure applying means operatively connected with said first mentioned means applied to said one disk and acting along a line of action coaxial with said other disk for urging said one disk toward the other, and pressure applying means operatively connected to said other of said disks for urging said other disk toward said one disk applied to said other disk and acting along a line of action coaxial with said one disk.

11. A power transmission comprising a pair of opposed disks respectively mounted for rotation about spaced parallel axes, means for applying a rotational effort to one of said disks, a cage supported for rotation about an axis parallel to the axes of said disks and adjacent a plane containing the axes of said disks, a plurality of balls mounted in said cage for rotation relative thereto and in engagement at their opposite sides with the opposed faces of said disks whereby the rotational effort of said one disk is transferred through said balls to the other of said disks, and pressure applying means operatively connected with each of said disks for urging said disks toward each other with forces directly proportional to the rotational effort transmitted through each of said disks respectively, the line of application of force on each disk by said pressure applying means being substantially coaxial with the axis of the other disk.

12. A power transmission comprising a pair of opposed disks respectively mounted for rotation about spaced parallel axes, means for applying a rotational effort to one of said disks, a cage supported for rotation about an axis parallel to the axes of said disks and adjacent the common centerline of said disks, a plurality of balls mounted in said cage for rotation relative thereto and in engagement at their opposite sides with the opposed faces of said disks whereby the rotational effort of said one disk is transferred through said balls to the other of said disks, and pressure applying means operatively connected with said first mentioned means for urging said one disk toward the other, said pressure applying means including a member in engagement with said one disk at a point on the opposite side of the axis of said cage from the axis of said one disk, and means screwthreadedly connecting said member with said first mentioned means.

13. A power transmission comprising a pair of opposed disks respectively mounted for rotation about spaced parallel axes, means for applying a rotational effort to one of said disks, a cage supported for rotation about an axis parallel to the axes of said disks and adjacent a plane containing the axes of said disks, a plurality of balls mounted in said cage for rotation relative thereto and in engagement at their opposite sides with the opposed faces of said disks whereby the rotational effort of said one disk is transferred through said balls to the other of said disks, a differential interposed between said means and said one disk, pressure applying means engaging one of said disks at a point on the opposite side of the axis of said cage from the axis of said one disk and actuated by the reactive rotational tendency of said differential for urging said disks together.

14. A power transmission comprising a pair of opposed disks respectively mounted for rotation about spaced parallel axes, a third disk interposed between said pair and supported for rotation about an axis parallel to the axes of said pair, a plurality of balls mounted in said third disk for rotation relative thereto and in engagement at their opposite sides with the opposed faces of said pair, means for applying a rotational effort to one of said three disks, whereby said rotational effort is transferred through said balls to one of the other two of said three disks, means for shifting one of said three disks in a direction transversely of said axes for varying the speed of rotation imparted to said other two of said three disks, said shifting means being adapted to move said one disk laterally of said direction to facilitate such shifting.

15. A power transmission comprising a pair of opposed disks respectively mounted for rotation about spaced parallel axes, a third disk interposed between said pair and supported for rotation about an axis parallel to the axes of said pair, a plurality of balls mounted in said third disk for rotation relative thereto and in engagement at their opposite sides with the opposed faces of said pair, means for applying a rotational effort to one of said three disks, whereby said rotational effort is transferred through said balls to one of the other two of said three disks, means for shifting two of said three disks in a direction transversely of said axes for varying the speed of rotation imparted to said other one of said three disks.

16. A power transmission comprising a plurality of spaced parallel rotatably supported coaxial driving disks, means for applying torque to said disks for rotating the same, a plurality of spaced parallel rotatably supported coaxial driven disks arranged in alternating relationship with said driven disks, coaxial cages interposed between adjacent pairs of driving and driven disks, a plurality of balls mounted in each of said cages and in rolling engagement with the opposed faces of the adjacent disks whereby the rotation of said driving disks is transmitted through said balls to said driven disks and means peripherally supporting said cage for rotation.

17. A power transmission comprising a pair of opposed disks respectively mounted for rotation about parallel axes, a third disk interposed between said pair and supported for rotation about an axis parallel to the axes of said pair, a plurality of balls mounted in said third disk for rotation relative thereto in positions such that equal sectors about the axis of rotation of said third disk contain approximately equal numbers of balls, and in engagement at their opposite sides with the opposed faces of said pair, means for applying rotational effort to one of said three disks, whereby said rotational effort is transferred through said balls to one of the other two of said three disks, and means having an effective line of action substantially coaxial with said third disk for urging said pair toward each other during such rotation, said last mentioned means exerting pressure on the side of one of said disks opposite said balls throughout an area substantially equal to the area of said third disk occupied by said balls.

18. A power transmission comprising a pair of opposed disks respectively mounted for rotation about parallel axes, a third disk interposed between said pair and supported for rotation about an axis parallel to the axes of said pair, a plurality of balls mounted in said third disk for rotation relative thereto and in engagement at their opposite sides with the opposed faces of said pair, means for applying a rotational effort to one of said three disks comprising a toothed gear, means transmitting the non-tangential force from said toothed gear to urge said pair together, whereby said rotational effort is transferred through said balls to one of the other two of said three disks.

19. A power transmission comprising a pair of opposed disks respectively mounted for rotation about parallel axes, a third disk interposed between said pair and supported for rotation about an axis parallel to the axes of said pair, a plurality of balls mounted in said third disk for rotation relative thereto and in engagement at their opposite sides with the opposed faces of said pair, means for applying a rotational effort to one of said three disks, whereby said rotational effort is transferred through said balls to one of the other two of said three disks, means for shifting said third disk in a direction substantially transversely of said axes for varying the speed of rotation imparted to said one of the other two of said three disks.

20. A power transmission comprising a pair of opposed disks respectively mounted for rotation about parallel axes, a third disk interposed between said pair and supported for rotation about an axis parallel to the axes of said pair, a plurality of balls mounted for rotation in said third disk in an area having its centroid substantially on the axis of said third disk, said balls being in engagement at their opposite sides with the opposed faces of said pair, means for applying a rotational effort to one of said three disks, whereby said rotational effort is transferred through said balls to one of the other two of said three disks.

21. In a power transmission, a first rotatable member having at least one substantially smooth surface, all radial profiles of which move within said surface during the rotation of said member, a second rotatable member with its axis coplanar with the axis of said first member having at least one substantially smooth surface equidistant from said first surface, at least one rolling element frictionally engaged by said two surfaces, a third member constraining said rolling element to move in a circular path about an axis lying substantially in the plane of the axes of said first two members.

22. In a power transmission, a first rotatable member having at least one substantially smooth surface, all radial profiles of which move within said surface during the rotation of said member, a second rotatable member with its axis coplanar with the axis of said first member having at least one substantially smooth surface equidistant from said first surface, at least one rolling element frictionally engaged by said two surfaces, a third member constraining said rolling element to move in a circular path about an axis lying substantially in the plane of the axes of said first two members, and adjustable means for holding at least one of said members with its axis in one of a plurality of positions substantially within said plane.

23. In a power transmission, a first rotatable member having at least one substantially smooth surface, all radial profiles of which move within said surface during the rotation of said member, a second rotatable member with its axis coplanar with the axis of said first member having at least one substantially smooth surface equidistant from said first surface, at least one rolling element frictionally engaged by said two surfaces, a third member constraining said rolling element to move in a circular path about an axis lying substantially in the plane of the axes of said first two members, and means for shifting said third member substantially transversely of the axes of said first two members.

24. In a power transmission, a first rotatable member having at least one substantially smooth surface, all radial profiles of which move within said surafce during the rotation of said member, a second rotatable member with its axis coplanar with the axes of said first member having at least one substantially smooth surface equidistant from said first surface, at least one rolling element frictionally engaged by said two surfaces, a third member constraining said rolling element to move in a circular path about an axis lying substantially in the plane of the axes of said first two members, and means urging said first two members toward each other substantially along a line of action coaxial with said third member.

25. In a power transmission, a first rotatable member having at least one substantially smooth surface, all radial profiles of which move within said surface during the rotation of said member, a second rotatable member with its axis coplanar with the axis of said first member having at least one substantially smooth surface equidistant from said first surface, at least one rolling element frictionally engaged by said two surfaces, a third member constraining said rolling element to move in a circular path about an axis lying substantially in the plane of the axes of said first two members, and means urging said first two members toward each other substantially along a line of action coaxial with said third member, with a force proportional to the torque in one of said first and second members.

26. In a power transmission, a first rotatable member having at least one substantially smooth surface, all radial profiles of which move within said surface during the rotation of said member, a second rotatable member with its axis coplanar with the axis of said first member having at least one substantially smooth surface equidistant from said first surface, at least one rolling element frictionally engaged by said two surfaces, a third member constraining said rolling element to move in a circular path about an axis lying substantially in the plane of the axes of said first two members, and means urging said first two members toward each other substantially along a line of action coaxial with one of said first two members.

27. In a power transmission, a first rotatable member having at least one substantially smooth surface, all radial profiles of which move within said surface during the rotation of said member, a second rotatable member with its axis coplanar with the axis of said first member having at least one substantially smooth surface equidistant from said first surface, at least one rolling element frictionally engaged by said two surfaces, a third member constraining said rolling element to move in a circular path about an axis lying substantially in the plane of the axes of said first two members, and means urging said first two members toward each other substantially along lines of action coaxial with said first two members.

28. In a power transmission, a first rotatable member having at least one substantially smooth surface, all radial profiles of which move within said surface during the rotation of said member, a second rotatable member with its axis coplanar with the axis of said first member having at least one substantially smooth surface equidistant from said first surface, at least one rolling element frictionally engaged by said two surfaces, a third member constraining said rolling element to move in a circular path about an axis lying substantially in the plane of the axes of said first two members, and screw threaded means urging said first two members toward each other substantially along lines of action coaxial with said first two members.

29. In a power transmission, a first rotatable member having at least one substantially smooth surface, all radial profiles of which move within said surface during the rotation of said member, a second rotatable member with its axis coplanar with the axis of said first member having at least one substantially smooth surface equidistant from said first surface, at least one rolling element frictionally engaged by said two surfaces, a third member constraining said rolling element to move in a circular path about an axis lying substantially in the plane of the axes of said first two members, and means for transmitting power to or from said first member, and means for transmitting power from or to said third member.

30. In a power transmission, a first rotatable member having at least one substantially smooth surface, all radial profiles of which move within said surface during the rotation of said member, a second rotatable member with its axis coplanar with the axis of said first member having at least one substantially smooth surface equidistant from said first surface, at least one rolling element frictionally engaged by said two surfaces, a third member constraining said rolling element to move in a circular path about an axis lying substantially in the plane of the axes of said first two members, and means acting along lines of action coaxial with both of said first and second members for urging the latter toward each other.

References Cited in the file of this patent

UNITED STATES PATENTS

| | | |
|---|---|---|
| 1,401,505 | Sykora | Dec. 27, 1921 |
| 1,814,165 | Jacobsen | July 14, 1931 |
| 2,057,482 | Erban | Oct. 13, 1936 |
| 2,656,739 | Dicke | Oct. 27, 1953 |
| 2,783,653 | Brown | Mar. 5, 1957 |

FOREIGN PATENTS

| | | |
|---|---|---|
| 928,749 | Germany | June 10, 1955 |